(12) United States Patent
Zhang et al.

(10) Patent No.: US 11,271,204 B2
(45) Date of Patent: Mar. 8, 2022

(54) ACTIVE MATERIAL FOR FLUORIDE-ION SECONDARY BATTERY AND FLUORIDE-ION SECONDARY BATTERY USING SAME

(71) Applicant: Panasonic Intellectual Property Management Co., Ltd., Osaka (JP)

(72) Inventors: Jin Zhang, Osaka (JP); Kazuko Asano, Osaka (JP); Mitsuhiro Hibino, Kyoto (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/984,877

(22) Filed: Aug. 4, 2020

(65) Prior Publication Data

US 2020/0381731 A1 Dec. 3, 2020

Related U.S. Application Data

(63) Continuation of application No. PCT/JP2019/045585, filed on Nov. 21, 2019.

(30) Foreign Application Priority Data

May 30, 2019 (JP) .............................. JP2019-101777

(51) Int. Cl.
*H01M 4/58* (2010.01)
*H01M 10/05* (2010.01)
(Continued)

(52) U.S. Cl.
CPC .......... *H01M 4/582* (2013.01); *C01G 49/009* (2013.01); *H01M 10/05* (2013.01);
(Continued)

(58) Field of Classification Search
CPC ........ C01G 45/06; C01G 49/10; C01G 51/08; C01P 2002/20; C01P 2002/72;
(Continued)

(56) References Cited

U.S. PATENT DOCUMENTS

2010/0035155 A1 2/2010 Okada et al.
2017/0237067 A1 8/2017 Miki et al.
(Continued)

FOREIGN PATENT DOCUMENTS

JP 2008-243646 10/2008
JP 2013-073792 4/2013
(Continued)

OTHER PUBLICATIONS

International Search Report of PCT application No. PCT/JP2019/045585 dated Feb. 4, 2020.

*Primary Examiner* — Brittany L Raymond
(74) *Attorney, Agent, or Firm* — McDermott Will and Emery LLP (57) ABSTRACT

Provided is an active material for a fluoride-ion secondary battery, the active material containing a composite fluoride. The composite fluoride has a layered structure and is represented by a composition formula $A_m M_n F_x$, where A is an alkali metal, M is a transition metal, $0<m\leq2$, $1\leq n\leq2$, and $3\leq x\leq4$. The alkali metal may be at least one kind selected from the group consisting of Na, K, Rb, and Cs. The transition metal may be a 3d transition metal.

10 Claims, 8 Drawing Sheets

(51) Int. Cl.
*C01G 49/00* (2006.01)
*H01M 4/02* (2006.01)

(52) U.S. Cl.
CPC ...... *C01P 2002/20* (2013.01); *C01P 2002/72* (2013.01); *C01P 2002/74* (2013.01); *C01P 2002/77* (2013.01); *C01P 2006/40* (2013.01); *H01M 2004/028* (2013.01)

(58) Field of Classification Search
CPC .............. C01P 2002/74; C01P 2002/76; C01P 2002/77; C01P 2006/40; C04B 35/553; C04B 35/62695; C04B 2235/3201; C04B 2235/3262; C04B 2235/3272; C04B 2235/3275; C04B 2235/6562; H01M 4/582; H01M 2004/028; H01M 10/05; Y02E 60/10
See application file for complete search history.

(56) References Cited

U.S. PATENT DOCUMENTS

2017/0346316 A1    11/2017  Nakamoto et al.
2018/0062174 A1*   3/2018   Takeshita .............. H01M 4/587

FOREIGN PATENT DOCUMENTS

| JP | 2013-145758 | | 7/2013 |
| JP | 2017-143044 | | 8/2017 |
| JP | 2017-216048 | A | 12/2017 |
| JP | 2018-041673 | * | 3/2018 |
| JP | 2019-050119 | | 3/2019 |
| WO | 2007/146453 | | 12/2007 |

\* cited by examiner

ACTIVE MATERIAL FOR FLUORIDE-ION SECONDARY BATTERY AND FLUORIDE-ION SECONDARY BATTERY USING SAME

BACKGROUND

1. Technical Field

The present disclosure relates to an active material for a fluoride-ion secondary battery and a fluoride-ion secondary battery using the same.

2. Description of the Related Art

Recently, as an anion-based battery, a fluoride-ion secondary battery using fluoride ions as carriers has been proposed.

For example, Patent Literature 1 discloses a fluoride-ion electrochemical cell. This Literature discloses $CF_x$, $AgF_x$, $CuF_x$, $NiF_x$, $CoF_x$, $PbF_x$, and $CeF_x$ as a positive electrode material, and $LaF_x$, $CaF_x$, $AlF_x$, $EuF_x$, $LiC_6$, $Li_xSi$, $SnF_x$, and $MnF_x$ as a negative electrode material.

Patent Literature 2 discloses an active material having a layered perovskite structure and having a crystal phase represented by a specific composition formula. Patent Literature 2 also discloses a fluoride-ion battery comprising the active material.

CITATION LIST

Patent Literature

Patent Literature 1: Japanese Patent Application Publication No. 2013-145758
Patent Literature 2: Japanese Patent Application Publication No. 2017-143044

SUMMARY

Technical Problem

The present disclosure provides a novel active material usable for a fluoride-ion secondary battery and a fluoride-ion secondary battery using the same.

Solution to Problem

The active material for a fluoride-ion secondary battery according to one aspect of the present disclosure contains a composite fluoride which has a layered structure and is represented by a composition formula $A_mM_nF_x$ (where A is an alkali metal, M is a transition metal, $0<m\leq2$, $1\leq n\leq2$, and $3\leq x\leq4$).

Advantageous Technical Effect

A novel active material usable for a fluoride-ion secondary battery and a fluoride-ion secondary battery using the same can be provided by the present disclosure.

DETAILED DESCRIPTION OF THE EMBODIMENT

The following description is a comprehensive or specific example. The numerical values, compositions, shapes, thicknesses, electrical characteristics, structures of secondary batteries, and electrode materials shown below are merely examples, and do not limit the present disclosure. Constituent elements which are not described in an independent claim indicating the highest concept are optional components.

In the following description, a composition of a material represented by a name of a substance is not limited to a stoichiometric composition and includes a non-stoichiometric composition, unless otherwise specified.

1. Active Material

1-1. Composition of Active Material

The active material according to the present embodiment contains a composite fluoride. The composite fluoride has a layered structure. The composite fluoride is represented by a composition formula $A_mM_nF_x$. A is an alkali metal. M is a transition metal. m satisfies a formula $0<m\leq2$. n satisfies a formula $1\leq n\leq2$. x satisfies a formula $3\leq x\leq4$. The composite fluoride contains two or more kinds of metal ions. The composite fluoride is usually a crystalline substance. The composite fluoride has, for example, a crystal phase represented by the above composition formula. The composite fluoride may be a metal composite fluoride. This active material is excellent in a cycle characteristic. This active material may be a positive electrode active material. Alternatively, this active material may be a negative electrode active material.

In the composition formula, $0<m$ is satisfied, so that improvement of defluorination reaction generated due to cationization of the alkali metal can be expected. $m\leq2$ and $1\leq n$ are satisfied, so that a ratio of the transition metal which bears an electrode reaction can be raised. $n\leq2$ is satisfied, so that a reaction of the transition metal having a relatively large valence (e.g., +2 to +4) can be used. In a case where large change in the valence in the electrode reaction can be used, potential of the electrode comprising the active material can be raised. $3 \le x \le 4$ is satisfied, so that a ratio of fluorine associated with the electrode reaction can be raised with suppression of decrease in density of the composite fluoride.

The alkali metal may be at least one kind selected from the group consisting of Na, K, Rb, and Cs. Desirably, the alkali metal is a species having a large ion radius such as Rb and Cs. The alkali metal may be a species having a small ion radius such as Na. Even in a case where the ion radius is small, a layered structure is established in the above composition. For example, $NaMnF_4$ may have a layered structure of a space group P121/C1 (see ICSD (Inorganic Crystal Structure Database) card No. 71455, 71456).

The transition metal may be a 3d transition metal. The 3d transition metal may be at least one kind selected from the group consisting of Mn, Co, and Fe. Mn, Co, and Fe can raise the electrode potential. This is supported by, for example, a calculation using a standard Gibbs energy of formation. Therefore, the active material containing at least one kind selected from the group consisting of Mn, Co, and Fe as the transition metal can function, for example, as a positive electrode active material.

Specific examples of the composite fluoride are $RbFeF_4$, $CsFeF_4$, $NaMnF_4$, $CsCoF_4$, $KMnF_4$, $KFeF_4$, $CsMnF_4$, and $RbMnF_4$.

The compositions of the active material and the composite fluoride can be determined with a technique of, for example, ICP (inductively coupled plasma) emission spectroscopy, ion chromatography, and Fourier transform infrared spectroscopy. The crystal structure of the composite fluoride can be determined with a powder XRD.

The active material may contain the above composite fluoride as a main component. Here, "contain as a main component" means containing more than 50 volume percent.

The active material may include a plurality of phases, and a part of the included plurality of the phases may belong to the above composite fluoride.

The active material may contain not only the above composite fluoride but also a fluoride of the same transition metal (for example, $MF_\alpha$; $\alpha$ is a real number of not less than 0) as the transition metal contained in the composite fluoride.

The active material has, for example, a shape of a particle. A mean particle size of the particles may be not less than 0.5 µm and not more than 50 µm. Energy density of a battery can be improved more in the active material having the mean particle size within this range than in an active material having a mean particle size having approximately not less than 10 nm and approximately not more than 100 nm. This is because an amount of a material other than the active material at the time of the formation of the electrode can be decreased. As will described later, in the above composite fluoride which has a layered structure and is represented by the specific composition formula, an ion conductive path from a surface of the active material toward the inside thereof can be formed. As a result, even if the mean particle size is within the above range, for example, high charge/discharge efficiency is secured. Therefore, the merit provided on the basis of the mean particle size within the above range is made particularly large. The mean particle size can be defined as, for example, an average value of particle diameters provided by evaluating at least 10 particles in an enlarged observation image of an electron microscope. The particle diameter can be defined as a diameter of a circle having the same area as the area of the particle to be evaluated in the observation image.

1-2. Possible Mechanism

As a conventional active material, a metal fluoride containing a single metal has been known (See Patent Literature 1). The metal fluoride exhibits a conversion reaction based on fluorination and defluorination along with charge/discharge of a battery. However, in the conventional metal fluoride, due to the fluorination and defluorination, it is difficult to maintain the crystal structure. Typically, the difficulty is observed as deposition of a metal at the time of the defluorination.

On the other hand, the composite fluoride of the present disclosure has a layered structure and is represented by the specific composition formula. Typically, this layered structure is a structure in which an alkali metal layer is interposed between layers each consisting of octahedrons each having the transition metal at the center thereof and fluorine atoms at the vertices thereof. Note that a size and an interlayer distance of a unit cell may be varied, depending on the kinds of the transition metal and the alkali metal, and depending on the composition of the composite fluoride. In this structure, change in the crystal structure generated due to the charge/discharge is reversible. As a result, for example, even in a case where a part of the crystal structure is changed due to discharge, the changed crystal structure can be restored by charge. In addition, in this structure, when a defect occurs in a site of a fluoride ion, a fluoride ion in an adjacent layer can be moved so as to fill up the defect. As a result, for example, this allows proceeding of the charge/discharge reaction utilizing the movement of the fluoride ions. In the reaction, the change in the crystal structure due to the discharge is suppressed. The above property of the composite fluoride allows the cycle characteristic as the active material and the fluoride-ion secondary battery to be improved. Note that to use the movement of the fluoride ions means to form the ion conductive path from the surface of the active material toward the inside thereof, as described above.

The above-described mechanism which describes the effects achievable by the active material of the present disclosure is just conjecture, and does not limit the present disclosure.

1-3. Manufacturing Method of Active Material

One example of the manufacturing method of the active material according to the present embodiment will be described.

First, as starting materials, a fluoride containing an alkali metal and a fluoride containing a transition metal are prepared.

The fluoride containing the alkali metal is, for example, a fluoride AF. A is, for example, at least one kind selected from the group consisting of Na, K, Rb, and Cs.

The fluoride containing the transition metal is, for example, a fluoride $MF_y$ of a transition metal. M is a transition metal and y is a valence of the transition metal. Examples of the fluoride of the transition metal are $MnF_3$, $CoF_3$, and $FeF_3$.

Note that the starting materials of the active material are not limited to the above examples. For example, a source of the transition metal may be a single metal. For example, a starting material containing a plurality of kinds of metals may be used.

The shape of each of the starting materials is, for example, a particle.

Next, the prepared starting materials are weighted. The weight of each of the starting materials is appropriately adjusted depending on the composition of the targeted composite fluoride.

Next, the weighted starting materials are mixed.

For example, the starting materials are mixed for a long time to provide the composite fluoride by a mechanochemical reaction. Examples of a mixing device are a ball mill, a rod mill, a bead mill, a jet mill, and a mix rotor. The mixing method may be a dry method or a wet method. In a case of the wet method, the starting materials and an organic solvent may be mixed. Examples of the organic solvents are ethanol and acetone. The mixing time is, for example, not less than 10 hours and not more than 48 hours.

Alternatively, the composite fluoride may be provided by mixing the starting materials for a short time, and then, sintering the mixed starting materials. For the mixing, the above mixing device may be used, or a mortar may be used. The mixing method may be a dry method or a wet method. The mixing time is, for example, not less than 1 minute and not more than 30 minutes if a mortar is used, and not less than 10 hours and not more than 24 hours if a ball mill is used. The mixture is sintered under an inert atmosphere. Examples of inert gases are nitrogen and argon. The mixture may be sintered under a vacuum atmosphere. The sintering temperature is varied depending on the kind of the starting materials and/or the target composition. The sintering temperature is set, for example, to not less than 150° C. and not more than 800° C. The sintering time is, for example, not less than 3 hours and not more than 24 hours.

The manufacturing method of the active material is not limited to the above example. Other examples of the manufacturing method of the active material are a gas phase method such as sputtering and chemical vapor deposition (CVD), and a liquid phase method such as an immersion method.

2. Fluoride-Ion Secondary Battery

2-1. Overall Structure

The active material according to the present embodiment may be used for a fluoride-ion secondary battery. The fluoride-ion secondary battery includes a positive electrode, a negative electrode, and an electrolyte having fluoride-ion conductivity.

Figure 1:
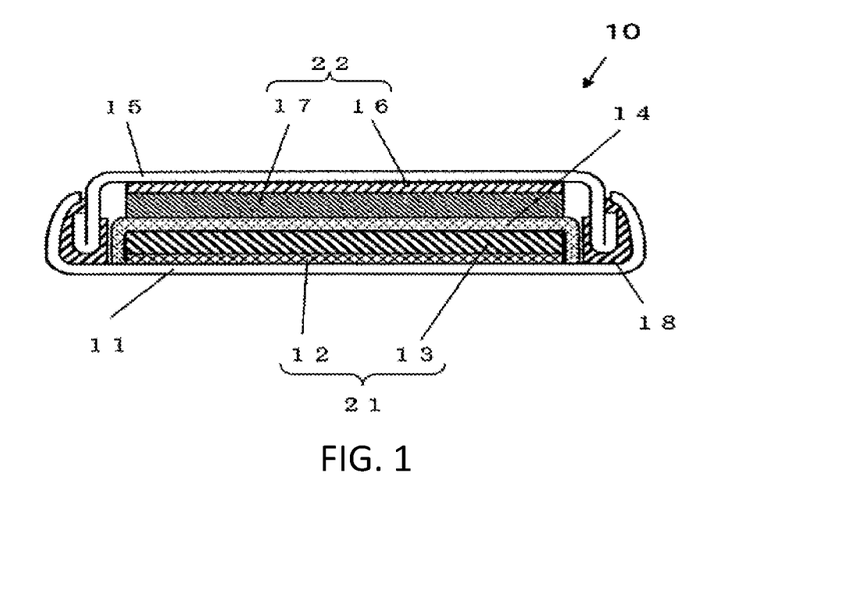
FIG. 1 is a cross-sectional view schematically showing a configuration example of a fluoride-ion secondary battery according to an embodiment.

FIG. 1 is a cross-sectional view schematically showing a configuration example of a fluoride-ion secondary battery 10.

The fluoride-ion secondary battery 10 comprises a positive electrode 21, a negative electrode 22, a separator 14, a casing 11, a sealing plate 15, and a gasket 18. The separator 14 is disposed between the positive electrode 21 and the negative electrode 22. The positive electrode 21, the negative electrode 22, and the separator 14 are impregnated with an electrolyte, and are contained in the casing 11. The casing 11 is sealed with the gasket 18 and the sealing plate 15.

The structure of the fluoride-ion secondary battery 10 may be, for example, a cylinder, a prism, a button, a coin, or a flat.

2-2. Positive Electrode

The positive electrode 21 includes a positive electrode current collector 12 and a positive electrode active material layer 13 which is disposed on the positive electrode current collector 12.

The positive electrode active material layer 13 may contain the active material described in the above section [1-1. Composition of Active Material]. Note that the amount of fluorine in the active material may be changed due to discharge and charge. As a result, in a case where the fluoride-ion secondary battery 10 is in a specific charged state, the active material may have a composition described in the above section [1-1. Composition of Active Material].

The specific charged state may be a fully charged state. Here, "fully charged state" means a state where the fluoride-ion secondary battery has reached the charge termination voltage and has been fully charged. In the fully charged state, all fluoride ions, an amount of which is equivalent to reversible capacity, have been incorporated in the positive electrode active material. The positive electrode active material according to the present embodiment can be deemed to be in a fully charged state, if charged potential is not less than 0.5 V based on potential of $Pb/PbF_2$.

The positive electrode active material does not have to be the above-mentioned active material. For example, the positive electrode active material may be a metal containing at least one kind selected from the group consisting of Cu, Ag, Hg, Mo, Co, V, Bi, Sb, Ni, Ti, Pb, Cd, Fe, Nb, Zn, Ga, and Cr, an alloy thereof, or a fluoride thereof. The positive electrode active material may be fluorocarbon.

The positive electrode active material layer 13 may include only one kind of the active material, or may include two or more kinds of the active materials.

The positive electrode active material layer 13 may further include at least one selected from the group consisting of a conductive agent, a binder, and an ionic conductor, if necessary.

Examples of the conductive agent are a carbon material, a metal, an inorganic compound, and a conductive polymer. Examples of the carbon material are graphite, carbon black, carbon nanotube, carbon fiber, graphene, fullerene, fluorinated graphite, and graphite oxide. Examples of the graphite are natural graphite and artificial graphite. Examples of the carbon black are acetylene black, ketjen black, channel black, furnace black, lamp black, and thermal black. Examples of the metals are copper, nickel, aluminum, silver, and gold. Examples of the inorganic compound are tungsten carbide, titanium carbide, tantalum carbide, molybdenum carbide, titanium boride, titanium nitride, titanium oxide, zinc oxide, and potassium titanate. Examples of the conductive polymer are polyaniline, polypyrrole, and polythiophene.

Examples of the binder are polyvinylidene fluoride, polytetrafluoroethylene, polyethylene, polypropylene, aramid resin, polyimide, polyimide, polyamideimide, polyacrylonitrile, polyacrylic acid, poly(methyl acrylate), poly(ethyl acrylate), poly(hexyl acrylate), polymethacrylic acid, poly (methyl methacrylate), poly(ethyl methacrylate), poly(hexyl methacrylate), polyvinyl acetate, polyvinylpyrrolidone, polyether, polyether sulfone, hexafluoropolypropylene, styrene butadiene rubber, and carboxymethylcellulose. The binder may be a copolymer of a plurality of kinds of monomers selected from the group consisting of, for example, tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

Examples of the ionic conductor are a Pb—K composite fluoride, an La—Ba composite fluoride, a Ce—Sr composite fluoride, a Cs—Ca composite fluoride, a Ce—Sr—Li composite fluoride, and a Pb—Sn composite fluoride, and a Pb—Sn—Zr composite fluoride.

Examples of a solvent for dispersing the positive electrode active material, the conductive agent, and the binder are N-methylpyrrolidone, dimethylformamide, dimethylacetamide, methyl ethyl ketone, cyclohexanone, methyl acetate, methyl acrylate, diethylene triamine, N,N-dimethylaminopropyl amines, ethylene oxide, and tetrahydrofuran. For example, a thickener may be added to a dispersant. Examples of the thickener are carboxymethylcellulose and methylcellulose.

The positive electrode active material layer 13 may be formed as below, for example.

First, the positive electrode active material, the conductive agent, and the binder are mixed. For example, the positive electrode active material and the conductive agent are mixed by the dry method for a long time (for example, not less than 10 hours and not more than 24 hours) using a mixing device such as a ball mill, and then, the binder is added thereto and further mixed. In this way, a positive electrode mixture is provided. Next, the positive electrode mixture is rolled into a plate shape with a rolling machine to form the positive electrode active material layer 13. Alternatively, the solvent may be added to the provided mixture to form a positive electrode mixture paste, and then, the positive electrode mixture paste may be applied to the surface of the positive electrode current collector 12. By drying the positive electrode mixture paste, the positive electrode active material layer 13 is provided. The positive electrode active material layer 13 may be compressed to increase the electrode density.

The thickness of the positive electrode active material layer 13 is not particularly limited, but may be not less than 1 μm and not more than 500 μm, and may be not less than 50 μm and not more than 200 μm.

The material of the positive electrode current collector 12 is, for example, a metal or an alloy. More specifically, the material of the positive electrode current collector 12 may be a metal containing at least one kind selected from the group consisting of copper, chromium, nickel, titanium, platinum, gold, aluminum, tungsten, iron, molybdenum, and zirconium or an alloy thereof. The material of the positive electrode current collector 12 may be, for example, stainless steel.

The positive electrode current collector 12 may be plate-shaped or foil-shaped, and may be porous, mesh, or non-porous. The positive electrode current collector 12 may be a laminated film. The positive electrode current collector 12 may have a layer formed of a carbon material such as carbon on the surface which is in contact with the positive electrode active material layer 13.

If the casing 11 doubles as a positive electrode current collector, the positive electrode current collector 12 may be omitted.

2-3. Negative Electrode

The negative electrode 22 includes, for example, a negative electrode current collector 16 and a negative electrode active material layer 17 which contains a negative electrode active material.

As long as the electrode potential of the negative electrode active material is lower than the electrode potential of the positive electrode active material, the negative electrode active material may be the active material described in the above section [1-1. Composition of Active Material]. Note that the amount of fluorine in the active material may be varied due to charge and discharge. As a result, for example, in a case where the fluoride-ion secondary battery 10 is in a specific discharged state, the active material may have the composition described in the above section [1-1. Composition of Active Material].

The specific discharged state may be, for example, a completely discharged state. Here, the "completely discharged state" means a state where the fluoride-ion secondary battery has reached the discharge termination voltage and has been completely discharged. In the completely discharged state, all fluoride ions, an amount of which is equivalent to reversible capacity, are incorporated in the negative electrode active material.

The negative electrode active material does not have to be the above active material. For example, the negative electrode active material may be a metal containing at least one kind selected from the group consisting of La, Ca, Al, Eu, C, Si, Ge, Sn, In, V, Cd, Cr, Fe, Zn, Ga, Ti, Nb, Mn, Yb, Zr, Sm, Ce, Rb, Cs, Mg, K, Na, Ba, and Sr, an alloy thereof, or a fluoride thereof.

The negative electrode active material layer 17 may include only one kind of the active material, or may include two or more kinds of the active materials.

The negative electrode active material layer 17 may further include at least one selected from the group consisting of a conductive agent, a binder, and an ionic conductor, if necessary. For the conductive agent, the binder, the ionic conductor, the solvent, and the thickener, for example, those described in the section [2-2. Positive electrode] may be used appropriately.

The thickness of the negative electrode active material layer 17 is not particularly limited, but may be not less than 1 μm and not more than 500 μm, and may be not less than 50 μm and not more than 200 μm.

For the material of the negative electrode current collector 16, for example, the same materials as those described in the above section [2-2. Positive electrode] for the positive electrode current collector 12 may be used appropriately. The negative electrode current collector 16 may be plate-shaped or foil-shaped.

If the casing 11 doubles as the negative electrode current collector, the negative electrode current collector 16 may be omitted.

2-4. Separator

Examples of the separator 14 are a porous membrane, a woven fabric, and a non-woven fabric. Examples of the non-woven fabric are a resin non-woven fabric, a glass fiber non-woven fabric, and a paper non-woven fabric. Examples of the material of the separator 14 are polyolefin such as polypropylene and polyethylene. The thickness of the separator 14 is, for example, not less than 10 μm and not more than 300 μm. The separator 14 may be a single-layer film composed of one kind of material, or a composite film or a multi-layered film composed of two or more kinds of materials. The porosity of the separator 14 is, for example, within a range of not less than 30% and not more than 70%.

2-5. Electrolyte

The electrolyte may be any material having fluoride-ion conductivity.

The electrolyte is, for example, an electrolytic liquid. The electrolytic liquid usually contains a solvent and a fluoride salt which has been dissolved in the solvent. The solvent may be water or a non-aqueous solvent.

Examples of the non-aqueous solvents are alcohols, cyclic ethers, chain ethers, cyclic carbonic acid ester, chain carbonic acid ester, cyclic carboxylic acid ester, and linear carboxylic acid ester.

Examples of the alcohol are ethanol, ethylene glycol, and propylene glycol.

Examples of the cyclic ethers are 4-methyl-1,3-dioxolan, 2-methyltetrahydrofuran, and crown ether. Examples of the chain ethers are 1,2-dimethoxyethane, ethylene glycol dimethyl ether, diethylene glycol dimethyl ether, triethylene glycol dimethyl ether, and tetraethylene glycol dimethyl ether. Examples of the cyclic carbonic acid ester are ethylene carbonate, propylene carbonate, butylene carbonate, fluoroethylene carbonate, and 4,5-difluoroethylene carbonate. Examples of the chain carbonic acid ester are dimethyl carbonate, ethyl methyl carbonate, and diethyl carbonate. An example of the cyclic carboxylic acid ester is γ-butyrolactone. Examples of the linear carboxylic acid ester are ethyl acetate, propyl acetate, and butyl acetate.

The non-aqueous solvent may be an ionic liquid.

Examples of cations of the ionic liquid are a 1-ethyl-3-methylimidazolium cation, a 1-ethylpyridinium cation, a 1-methoxyethyl-1-methylpyrrolidinium cation, an N-methyl-N-propylpiperidinium cation, a trimethylbutylammonium cation, an N, N-diethyl-N-methylmethoxyethylammonium cation, a tetrabutylphosphonium cation, a triethyl-(2-methoxyethyl)phosphonium cation, a triethylsulfonium cation, and a diethyl-(2-methoxyethyl) sulfonium cation.

Examples of anions of the ionic liquid are a bis(fluorosulfonyl)amide anion, a bis(trifluoromethanesulfonyl)amide anion, a hexafluorophosphate anion, a tris (pentafluoroethyl) trifluorophosphate anion, a trifluoromethanesulfonate anion, and a tetrafluoroborate anion.

The electrolyte may contain only one kind of solvent, or may contain two or more kinds of solvents.

Examples of the fluoride salts are inorganic fluoride salts, organic fluoride salts, and ionic liquids.

Examples of the inorganic fluoride salts are lithium fluoride, sodium fluoride, potassium fluoride, rubidium fluoride, cesium fluoride, and ammonium fluoride.

Examples of the organic fluoride salts are tetramethylammonium fluoride, neopentyltrimethylammonium fluoride, trineopentylmethylammonium fluoride, tetraneopentylammonium fluoride, 1,3,3,6,6-hexamethylpiperidinium fluoride, 1-methyl-1-propylpiperidinium fluoride, tetramethylphosphonium fluoride, tetraphenylphosphonium fluoride, and trimethylsulfonium fluoride.

The electrolyte may contain only one kind of the fluoride salt or two or more kinds of the fluoride salts.

The solvent and the fluoride salt are, for example, sealed in a sealed container and mixed by stirring. In this way, the fluoride salt is dissolved in the solvent. The fluoride salt does not have to be completely dissolved in the solvent, and may be partially dissolved.

A molar ratio of the fluoride salt to the solvent in the electrolytic liquid is not particularly limited, and may be, for example, not less than 1/150 and not more than 1/2, not less than 1/30 and not more than 1/4, and not less than 1/10 and not more than 1/5. This allows the concentration of the fluoride ions in the electrolytic liquid to be raised with suppression of increase in the viscosity of the electrolytic liquid.

In a case where the positive electrode active material or the negative electrode active material contains the composite fluoride described in the above section [1. Active Material], the electrolyte may contain ions of the same kind of the alkali metal as the alkali metal contained in the above composite fluoride. Besides, the electrolyte may further contain ions of the same kind of the transition metal as the transition metal contained in the above composite fluoride.

2-6. Variation

Figure 2:
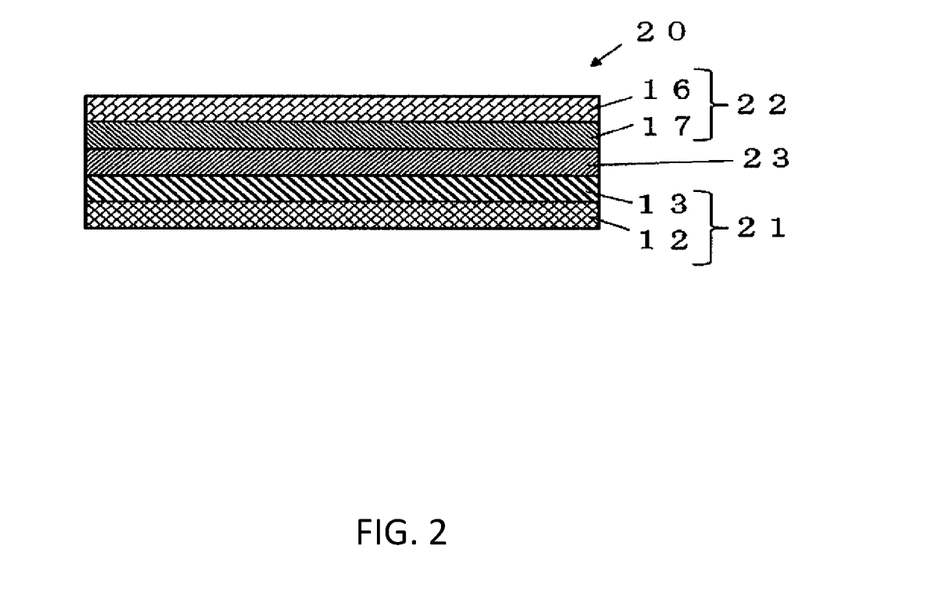
FIG. 2 is a cross-sectional view schematically showing a variation of the fluoride-ion secondary battery according to the embodiment.

FIG. 2 is a cross-sectional view schematically showing a configuration example of a fluoride-ion secondary battery 20.

The fluoride-ion secondary battery 20 comprises a positive electrode 21, a negative electrode 22, and a solid electrolyte 23. The positive electrode 21, the solid electrolyte 23, and the negative electrode 22 are stacked in this order to form a stacking structure.

The positive electrode 21 is the same as that described in the above section [2-2. Positive electrode]. The negative electrode 22 is the same as that described in the above section [2-3. Negative electrode].

For the solid electrolyte 23, for example, the ionic conductor described in the above section [2-2. Positive electrode] is used.

The thickness of the solid electrolyte 23 is not particularly limited, but may be not less than 1 μm and not more than 100 μm.

3. Experimental Result 3-1. Production of Sample

Samples of the active material were produced in accordance of the procedure described below.

3-1-1. Production of Sample 1

Rubidium fluoride anhydride (RbF) and iron (III) fluoride anhydride ($FeF_3$) were prepared as starting materials. Weights of these starting materials were measured in such a manner that a molar ratio was RbF:$FeF_3$=1:1 and that a total mass was 1.5 g. The weight-measured starting materials were put in an agate mortar, and then, mixed in a dry method for 15 minutes to provide a powder mixture. The powder mixture was put in a mold, and pressured to provide pellets. The pellets were put on a combustion boat overlaid with Pt foil, and then the combustion boat having the pellets and the Pt foil was loaded into a small electric furnace. The temperature inside the furnace was raised from room temperature to 600° C. at a rate of 300° C./hour, and then, was maintained at 600° C. for 12 hours. In this way, the mixture was sintered to provide the sample 1, which was an active material of an inventive example. All of the works so far were performed in a glove box. The inside of the glove box was maintained at an argon atmosphere having a dew point of not more than −60° C. and an oxygen value of not more than 1 ppm.

3-1-2. Production of Sample 2

The sample 2, which was an active material of an inventive example, was provided in the same manner as the sample 1, except that cesium fluoride anhydride (CsF) was used in place of RbF.

3-1-3. Preparation of Sample 3 (Comparative Example)

$CoF_3$ was prepared as the sample 3, which was an active material of a comparative example.

3-2. Analysis of Samples

Figure 3:
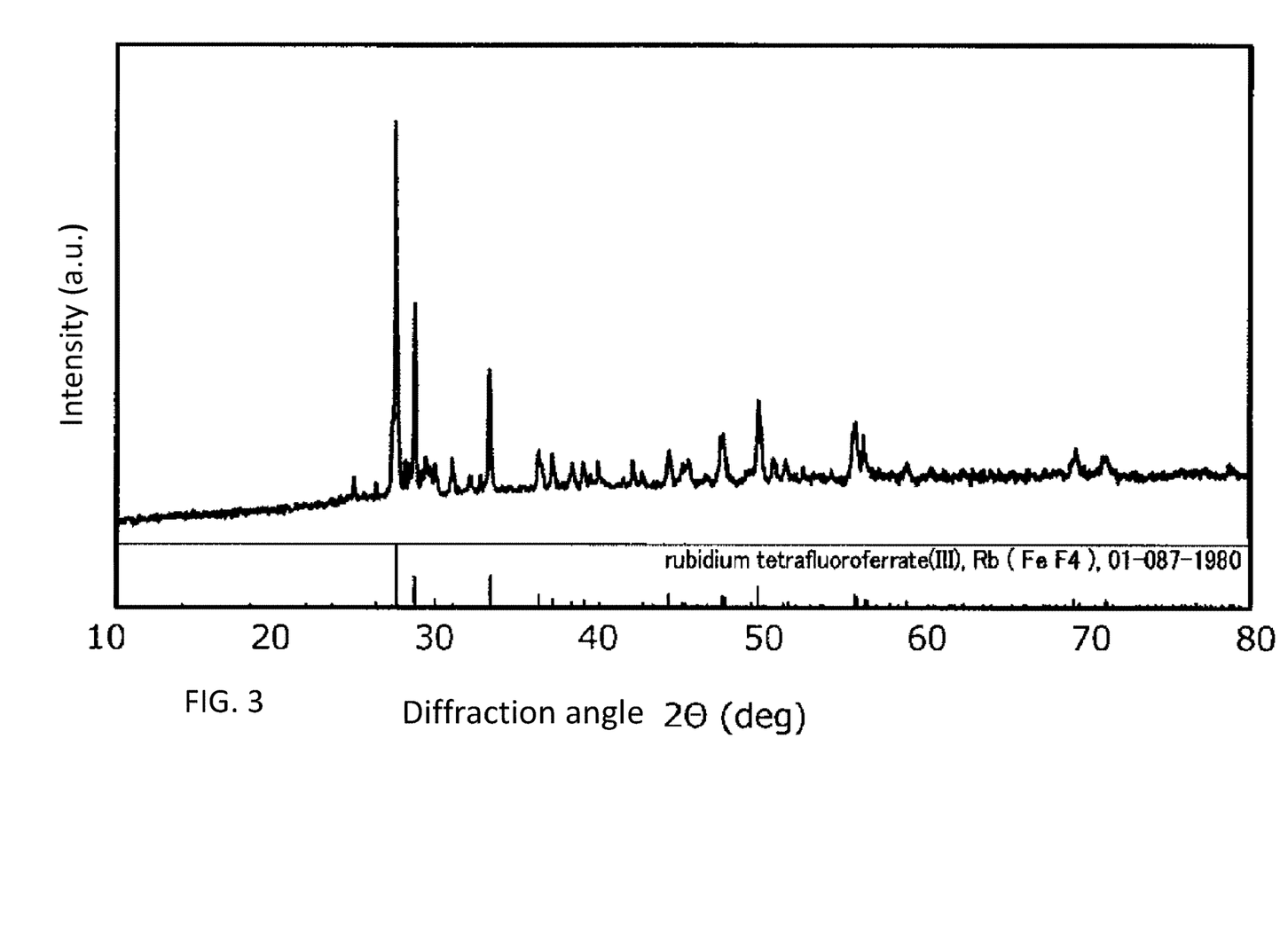
FIG. 3 is a graph showing X-ray diffraction (hereinafter, referred to as "XRD") peaks of an active material sample 1 produced in the examples.
Figure 4:
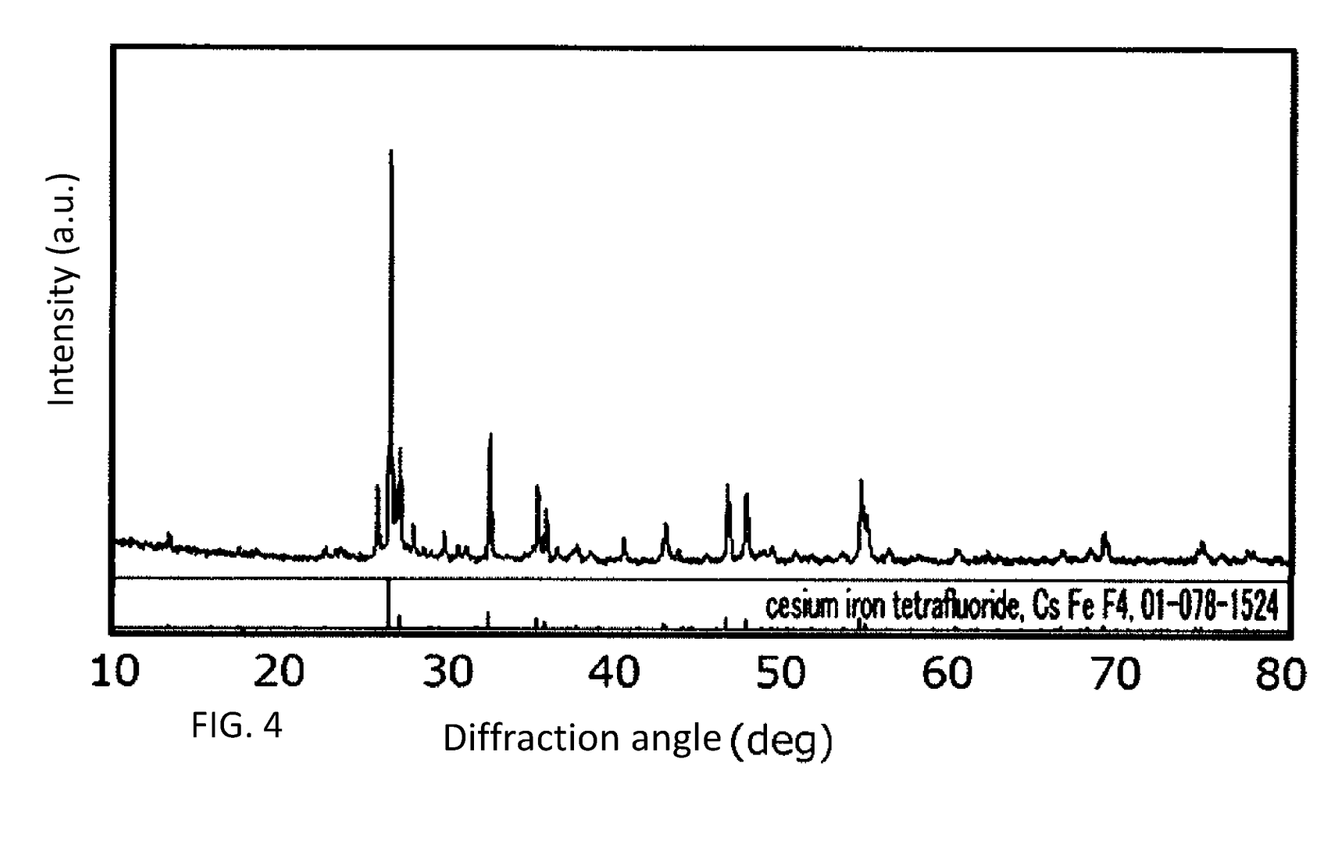
FIG. 4 is a graph showing XRD peaks of an active material sample 2 produced in the examples.
Figure 5:
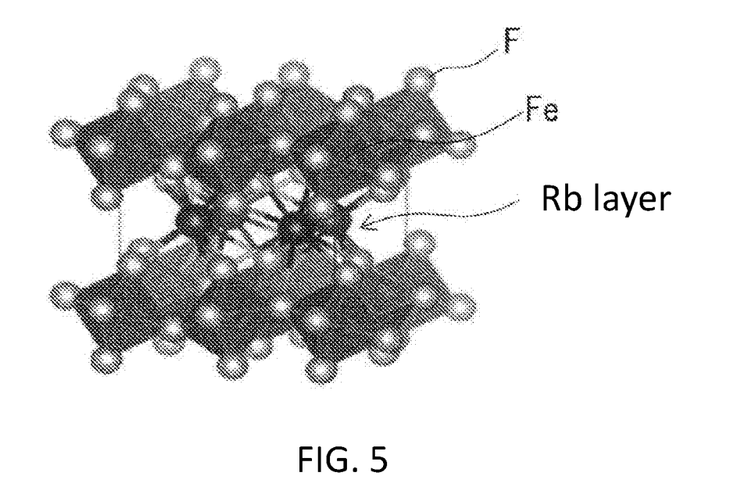
FIG. 5 is a schematic diagram showing a crystal structure which may be contained in the active material sample 1.
Figure 6:
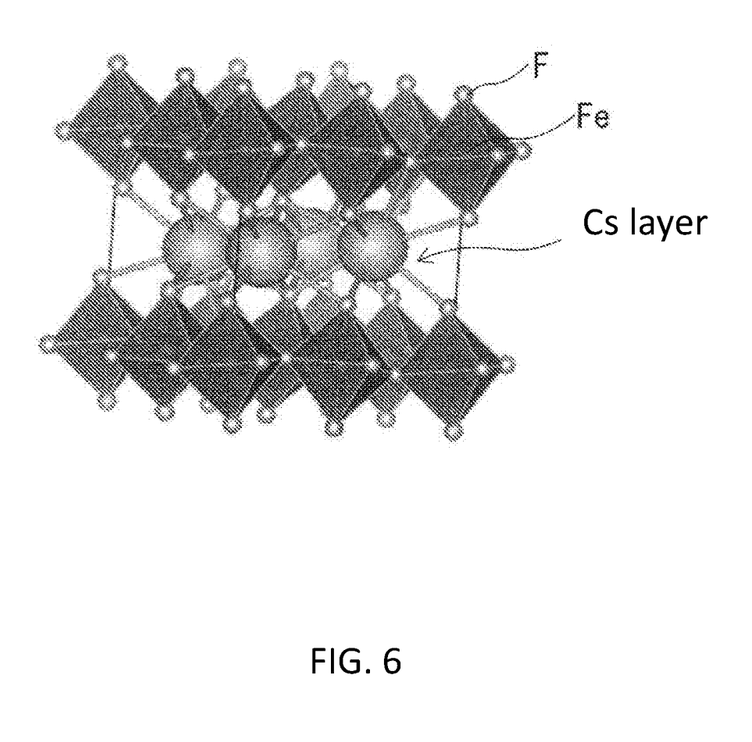
FIG. 6 is a schematic diagram showing a crystal structure which may be contained in the active material sample 2.

Phase compositions of the samples 1 and 2 were analyzed with an XRD. For the analysis, a desk-top X-ray diffraction device (Product of Rigaku Corporation, trade name: MiniFlex 300) was used. In addition, a wavelength of the X-ray was 1.5418 Å (CuKα ray). A Ni filter was used to provide the CuKα ray. FIGS. 3 and 4 show XRD peaks of the samples 1 and 2, respectively. In addition, FIGS. 3 and 4 also show XRD peaks of $RbFeF_4$ identified according to an ICSD card No. 85499 and $CsFeF_4$ identified according to an ICSD card No. 62696. Except for peaks which were assumed to be derived from impurities, the XRD peaks of the samples 1 and 2 matched the XRD peaks identified according to the ICSD cards well. It is generally known that $RbFeF_4$ and $CsFeF_4$ exhibiting the peaks identified according to the ICSD cards have layered structures shown in FIG. 5 and FIG. 6, respectively. In other words, the present inventors confirmed that, as respective main crystal phases, the sample 1 has a layered structure of $RbFeF_4$ and the sample 2 has a layered structure of $CsFeF_4$. The structure of FIG. 5 has a structure in which a Rb layer is interposed between layers each consisting of octahedrons each having a Fe atom at the center thereof and fluorine atoms at the vertices thereof. A Rb atom is bound to a fluorine atom which forms a part of one of the octahedrons. The space group of the structure of FIG. 5 is P4/mbm. The structure of FIG. 6 has a structure in which a Cs layer is interposed between layers each consisting of octahedrons each having a Fe atom at the center thereof and fluorine atoms at the vertices thereof. A Cs atom is bound to a fluorine atom which forms a part of one of the octahedrons. Cs is bound to fluorine which forms a part of the octahedron. The space group of the structure of FIG. 6 is P4/nmm.

3-3. Production of Batteries

Using the sample 1 as a positive electrode active material, a battery cell for evaluation was produced. All of the production of the batteries was performed in a globe box. The inside of the globe box was maintained at an argon atmosphere having a dew point of not more than −60° C. and an oxygen value of not more than 1 ppm.

The sample 1, acetylene black, and polytetrafluoroethylene were prepared so as to have a mass ratio of 7:2:1. The prepared starting materials were mixed in an agate mortar to provide a positive electrode mixture. The positive electrode mixture was rolled with a roll press machine so as to have a thickness of 100 μm. The rolled positive electrode mixture was punched to provide a positive electrode mixture plate having a shape of a square of 5 mm×5 mm. The positive electrode mixture plate was put on a Pt mesh having a size of 8 mm×30 mm, and then, was set in a press machine. The pressure bonding of the positive electrode mixture plate and the Pt mesh at a pressure of 20 MPa for 10 seconds was performed to provide a positive electrode containing the sample 1.

As a counter electrode, a Pb plate having a size of 8 mm×30 mm was prepared

As a reference electrode, a $Pb/PbF_2$ reference electrode was prepared. The $Pb/PbF_2$ reference electrode was composed of a glass tube filled with an inner solution and a Pb wire which was inserted into the glass tube and had $PbF_2$ on the surface thereof. As the inner solution, an ethylene glycol (hereinafter, referred to as "EG") of CsF was used. A molar ratio of CsF and EG in the inner solution was CsF:EG=1:10.

The positive electrode as a working electrode, the counter electrode, and the reference electrode were set in an H-type cell, and the H-type cell was filled with an electrolytic liquid. As the electrolytic liquid, an EG solution of CsF was used. A molar ratio of CsF and EG in the electrolytic liquid was CsF:EG=1:10. In the H-type cell, the working electrode and the reference electrode were separated from the counter electrode with a glass filter.

As above, a battery cell 1 in which the sample 1 was used as the positive electrode active material was provided.

In a similar way, a battery cell 2 in which the sample 2 was used as the positive electrode active material was produced.

In a similar way, a battery cell 3 in which the sample 3 (comparative example) was used as the positive electrode active material was produced.

3-4. Discharge Test

Figure 7:
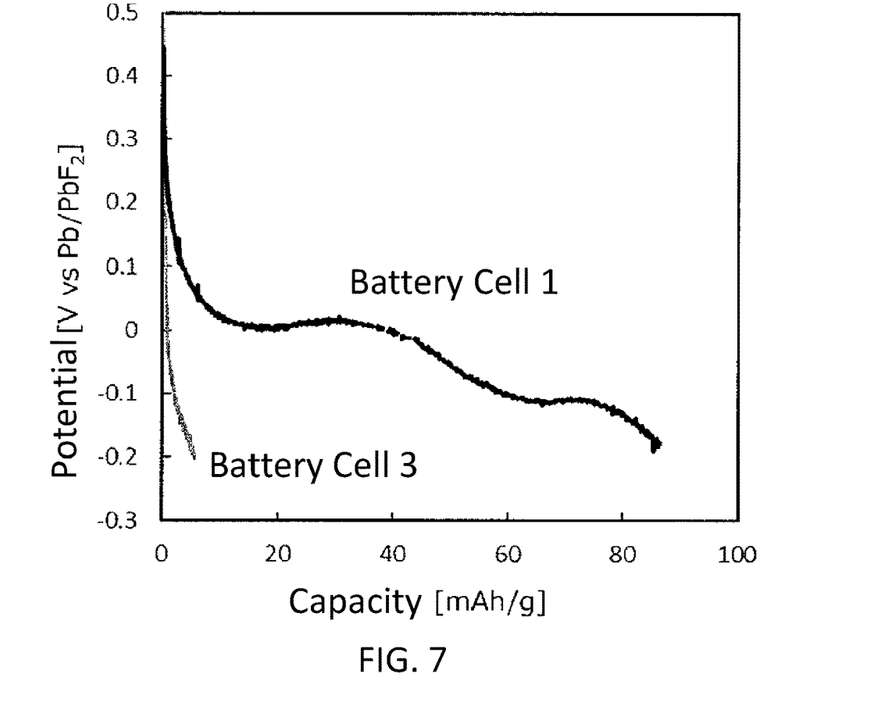
FIG. 7 is a graph showing discharge curves of a battery cell 1 using the active material sample 1 and a battery cell 3 (comparative example) using an active material sample 3.

Discharge test of the battery cell 1 and the battery cell 3 was performed. The test was performed in a thermostat chamber at 25° C. In the test, the battery cells were discharged at current density of 2.2 mA/g until the potential of the working electrode reached −0.2 V with respect to the potential of the reference electrode. FIG. 7 shows discharge curves provided by performing the test. As shown in FIG. 7, in the battery cell 1, a discharge characteristic in which the potential was lowered at the start of the discharge, and then, the potential was lowered gently after a discharge capacity excessed 10 mAh/g was provided. The discharge characteristic in which the potential is lowered gently with an increase in the discharge capacity is stable and appropriate for a secondary battery. On the other hand, in the battery cell 3, which was a comparative example, a discharge characteristic in which the potential was lowered rapidly at the start of the discharge, and then, the potential rapidly reached −0.2 V at which the electrolytic liquid may be decomposed was provided. It was estimated that the discharge characteristic of the battery cell 3 was caused by the fact that the crystal structure of $CoF_3$ used as the active material was collapsed by the discharge. The present inventors confirmed that the battery cell 3 failed to function as a secondary battery. The discharge capacities of the battery cells 1 and 3 confirmed in the test was approximately 85 mAh/g and less than 10 mAh/g, respectively.

3-5. Charge/Discharge Test

Charge/discharge test of the battery cell 1 and the battery cell 2 was performed. The test was performed in the thermostat chamber at 25° C. The battery cells were discharged at a current density of 2.2 mA/g until the potential of the working electrode reached −0.1 V (the battery cell 1) or −0.3 V (the battery cell 2) with respect to the potential of the reference electrode. The charge was performed by maintaining an open circuit state for 10 hours after the discharge, and then, charging the batteries until the potential of the working electrode reached 0.5 V with respect to the potential of the reference electrode. The current density during the charge was the same as the current density during the discharge. On the basis of the charge/discharge test, initial discharge/charge characteristics of the battery cells were evaluated.

Figure 8:
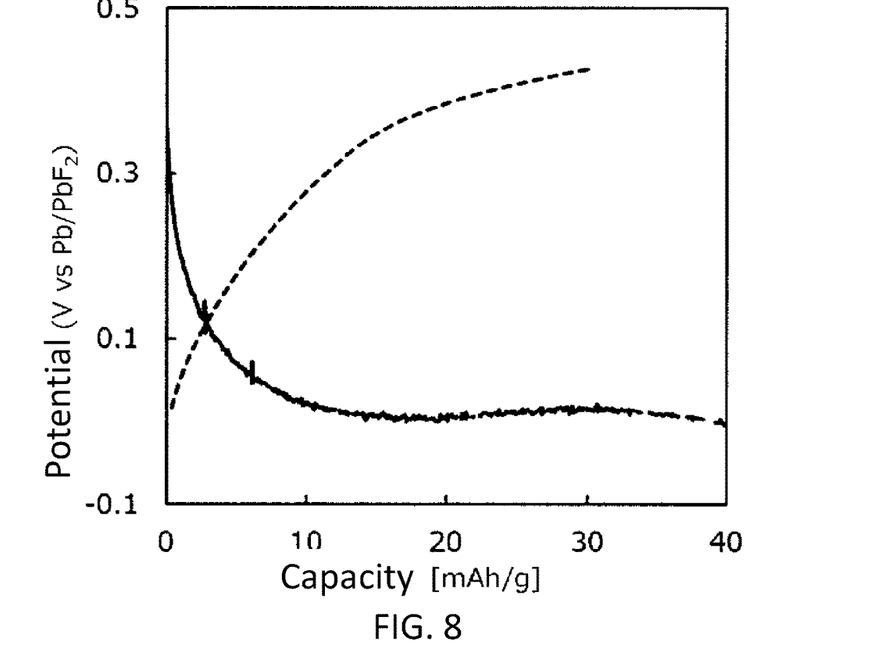
FIG. 8 is a graph showing charge/discharge curves of the battery cell 1.
Figure 9:
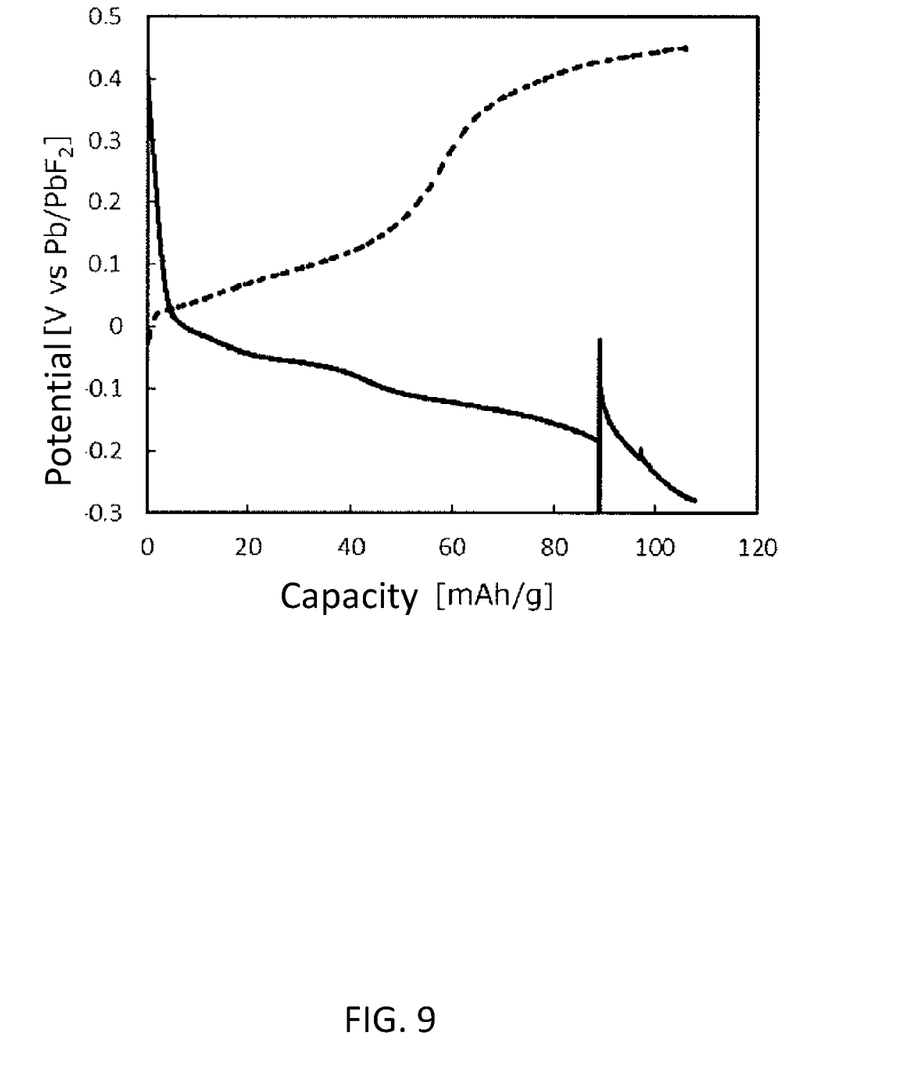
FIG. 9 is a graph showing charge/discharge curves of a battery cell 2 using the active material sample 2.

FIGS. 8 and 9 show charge/discharge curves of the battery cells 1 and 2 in the test. Plots of the solid lines in the graphs of FIGS. 8 and 9 are discharge curves, and plots of dotted lines are charge curves. The discharge characteristic of the battery 1 has been described above. In the battery cell 2, a discharge characteristic in which the potential was lowered at the start of the discharge, and then, the potential was lowered gently after the discharge capacity excessed 5 mAh/g was provided (See FIG. 9). In addition, the potential of both of the battery cells 1 and 2 tended to increase gradually during the charge. The discharge capacity of the battery cell 2 confirmed in the test was approximately 100 mAh/g. Note that theoretical capacity of the battery cell 2 on the basis of one electron reaction was 101 mAh/g.

Figure 10:
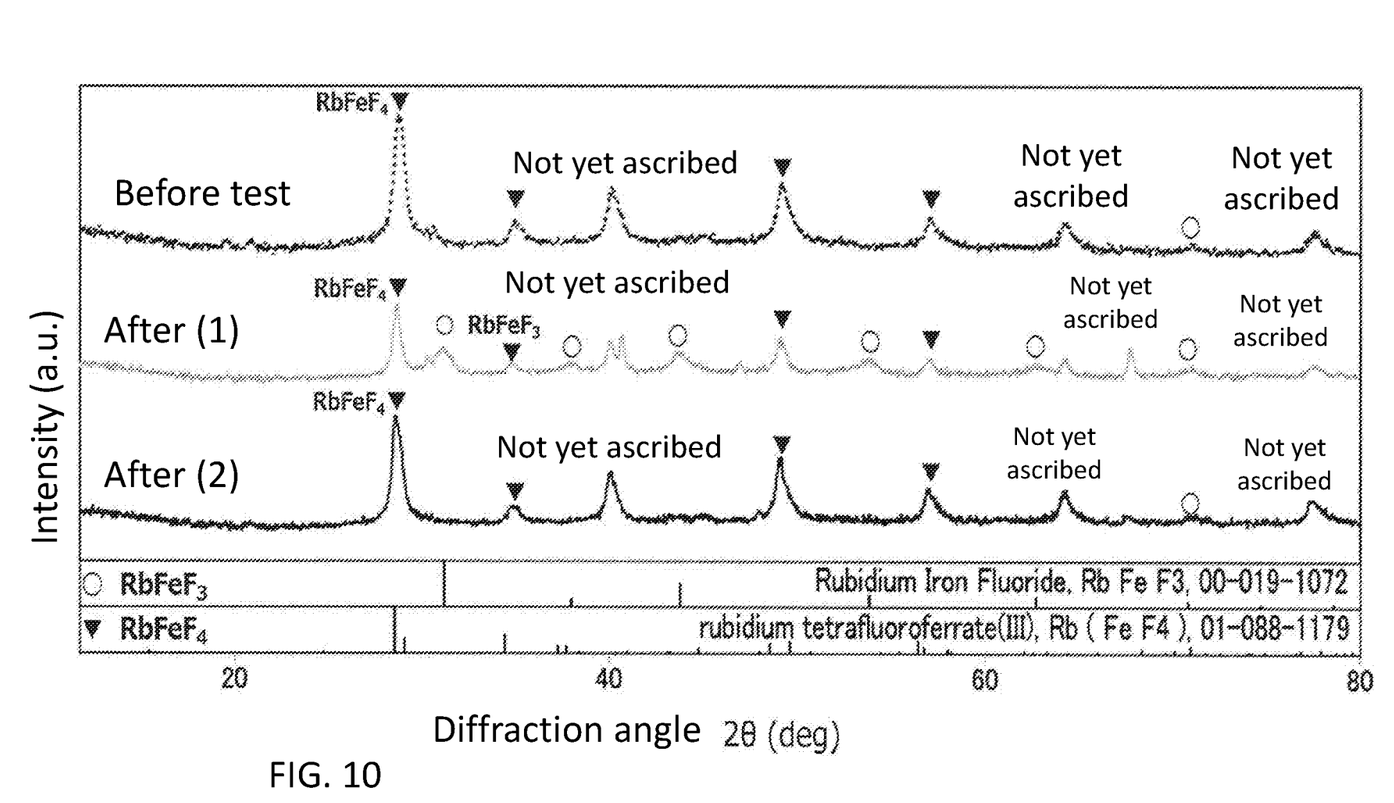
FIG. 10 is a graph showing XRD peaks of the active material sample 1 before and after a discharge test and a charge/discharge test.

The phase composition of the sample 1 used as the active material of the battery cell 1 after (1) the following discharge test of the battery cell and after (2) the following charge/discharge test of the battery cell was analyzed with an XRD.

(1) The discharge test in which the battery was discharged until a potential of the working electrode with respect to the reference electrode reaches −0.5 V. The current density of the discharge was 2.2 mA/g.

(2) The charge/discharge test described in the section [3-5. Charge/Discharge Test].

FIG. 10 shows XRD peaks in the tests. FIG. 10 also shows the XRD peaks of the sample 1 at the time before the test was started. FIG. 10 also shows the XRD peaks of RbFeF$_4$ and RbFeF$_3$ identified according to the ICSD cards. In FIG. 10, the upper plot is XRD peaks before the discharge test and the charge/discharge test. The intermediate plot is XRD peaks after (1) the discharge test. The lower plot is XRD peaks after (2) the charge/discharge test. In each plot, peaks indicated by triangle markers are ascribed to RbFeF$_4$. In addition, peaks indicated by circle markers are ascribed to RbFeF$_3$.

As shown in FIG. 10, change in a part of RbFeF$_4$ to RbFeF$_3$ due to the discharge was observed. In addition, the present inventors observed that RbFeF$_3$ which had been formed during the discharge was returned to RbFeF$_4$ by the charge. Furthermore, the present inventors observed that the layered structure was maintained during the discharge and during the charge. In other words, the present inventors observed that, during the charge/discharge, the sample 1 exhibits the following reversible reaction in which the layered structure is maintained.

$$RbFeF_4 + e^- \leftrightarrow RbFeF_3 + F^-$$

3-6. Charge/Discharge Cycle Test

Figure 11:
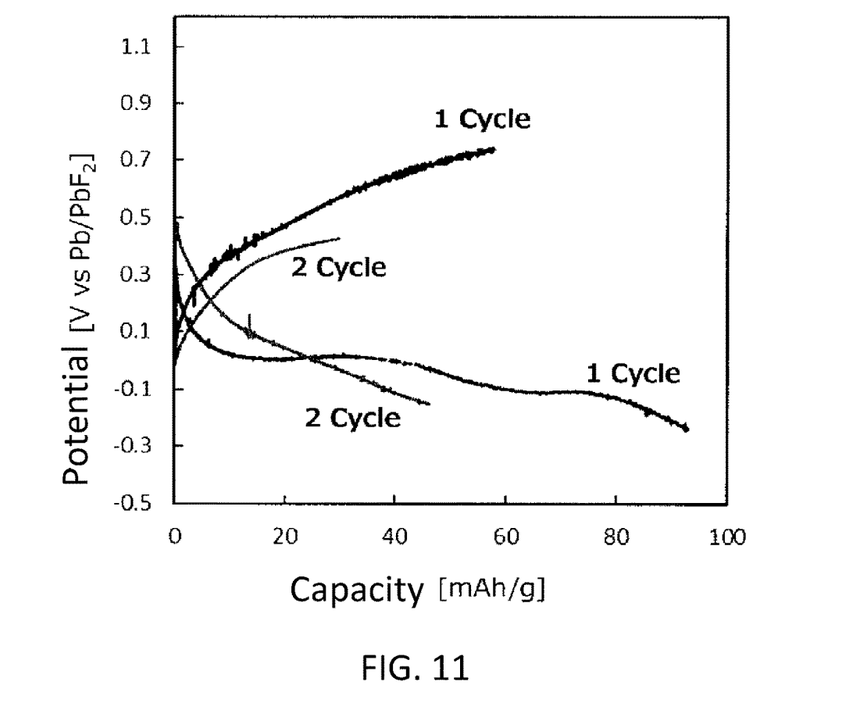
FIG. 11 is a graph showing a cycle characteristic of the battery cell 1.
Figure 12:
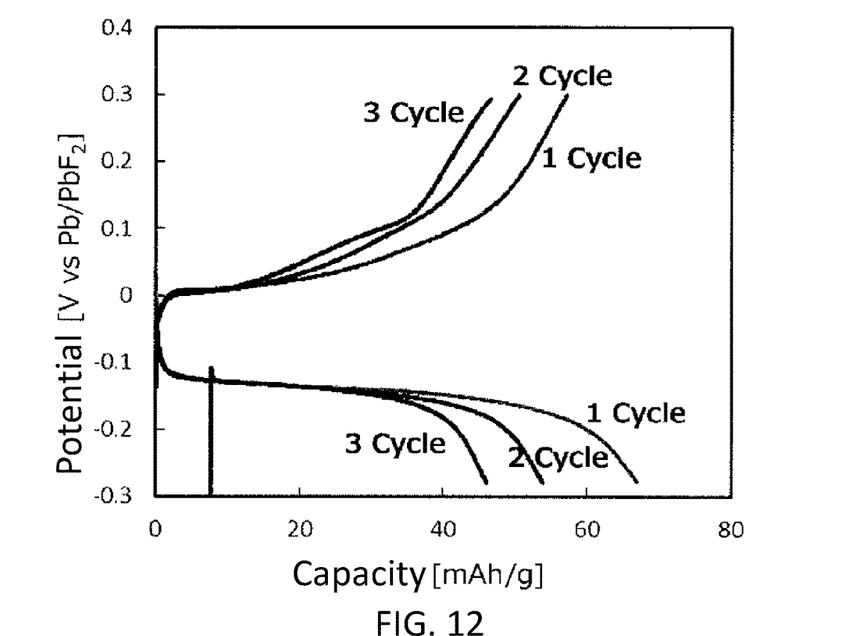
FIG. 12 is a graph showing a cycle characteristic of the battery cell 2.

For the battery cell 1, the charge/discharge test described in the section [3-5. Charge/Discharge Test] was performed for 2 cycles. For the battery cell 2, the charge/discharge test was performed for 3 cycles. Hereinafter, the potential is referred to on the basis of the potential of the working electrode with respect to the potential of the reference electrode. For the battery cell 1, the discharge termination potential and the charge termination potential of the first cycle were −0.28 V and 0.75 V, respectively. The discharge termination potential and the charge termination potential of the second cycle were −0.16 V and 0.45 V, respectively. For the battery cell 2, the current density of the discharge and the charge was 4.4 mA/g. FIGS. 11 and 12 show the cycle characteristics of the battery cells 1 and 2 provided in the test, respectively. As shown in FIGS. 11 and 12, in the battery cells 1 and 2, a cycle characteristic which was not provided by the battery cell 3 was provided. In other words, the cycle characteristic was improved, as compared to the battery cell 3.

3-7. Supplement

It is estimated that each characteristic observed in the samples 1 and 2 is based on the mechanism described in the above section [1-2. Possible mechanism]. For this reason, it is estimated that this effect would be provided not only in the specific composition proved in the above experiment but also in other compositions described in the section [1-1. Composition of Active Material].

INDUSTRIAL APPLICABILITY

The active material according to the present disclosure can be employed, for example, for a fluoride-ion secondary battery.

REFERENTIAL SIGNS LIST

10, 20 Fluoride-ion secondary battery
11 Casing
12 Positive electrode current collector
13 Positive electrode active material layer
14 Separator
15 Sealing plate
16 Negative electrode current collector
17 Negative electrode active material layer
18 Gasket
21 Positive electrode
22 Negative electrode
23 Solid electrolyte

The invention claimed is:

1. An active material for a fluoride-ion secondary battery, the active material containing:
   a composite fluoride which has a layered structure and is represented by a composition formula $A_mM_nF_x$,
   where
   A is an alkali metal;
   M is a transition metal;
   $0 < m \leq 2$;
   $1 < n \leq 2$; and
   $3 \leq x \leq 4$.

2. The active material for the fluoride-ion secondary battery according to claim 1, wherein
   the alkali metal is at least one kind selected from the group consisting of Na, K, Rb, and Cs.

3. The active material for the fluoride-ion secondary battery according to claim 1, wherein the transition metal is a 3d transition metal.

4. The active material for the fluoride-ion secondary battery according to claim 3, wherein the transition metal is at least one kind selected from the group consisting of Mn, Co, and Fe.

5. The active material for the fluoride-ion secondary battery according to claim 1, wherein the alkali metal is at least one kind selected from the group consisting of K, Rb, and Cs.

6. The active material for the fluoride-ion secondary battery according to claim 1, wherein the active material has a shape of a particle.

7. The active material for the fluoride-ion secondary battery according to claim 6, wherein particles of the active material have a mean particle size of not less than 0.5 μm and not more than 50 μm.

8. The active material for the fluoride-ion secondary battery according to claim 1, wherein x is 4.

9. The active material for the fluoride-ion secondary battery according to claim 1, wherein the layered structure is a structure in which a layer including the alkali metal is interposed between layers each including the transition metal.

10. A fluoride-ion secondary battery, comprising:
a positive electrode including an active material;
a negative electrode; and
an electrolyte having fluoride-ion conductivity,
wherein the active material is the active material for the fluoride-ion secondary battery according to claim 1.

* * * * *